United States Patent [19]
Yoshida

[11] Patent Number: 5,828,486
[45] Date of Patent: Oct. 27, 1998

[54] OPTICAL AMPLIFIER DEVICE FOR WAVELENGTH DIVISION MULTIPLEXING OPTICAL TRANSMISSION

[75] Inventor: Takashi Yoshida, Tokyo, Japan

[73] Assignee: NEC Corporation, Tokyo, Japan

[21] Appl. No.: 904,611

[22] Filed: Aug. 1, 1997

[30] Foreign Application Priority Data

Aug. 1, 1996 [JP] Japan ................................. 8-203888

[51] Int. Cl.6 ............................ H01S 3/00; H04B 10/00
[52] U.S. Cl. .......................... 359/341; 349/134; 349/337
[58] Field of Search .................................. 354/134, 160, 354/337, 341

[56] References Cited

U.S. PATENT DOCUMENTS

| | | | |
|---|---|---|---|
| 5,268,786 | 12/1993 | Matsushita et al. | 359/341 |
| 5,463,487 | 10/1995 | Epworth | 359/161 |
| 5,510,926 | 4/1996 | Bayart et al. | 359/179 |
| 5,519,796 | 5/1996 | Li et al. | 385/24 |
| 5,570,221 | 10/1996 | Fujita | 359/3 |
| 5,664,131 | 9/1997 | Sugiya et al. | 359/341 |
| 5,680,247 | 10/1997 | Okuno | 359/341 |

FOREIGN PATENT DOCUMENTS 2294170  4/1996  United Kingdom .

*Primary Examiner*—Nelson Moskowitz
*Attorney, Agent, or Firm*—Young & Thompson

[57] ABSTRACT

On the output side of an optical fiber which optically amplifies a wavelength division multiplexed signal light to output amplified signal light, a first optical divider is provided. The amplified signal light is partially divided by the divider and is converted to an electric signal by an photoelectric converter. The electric signal is compared with a prescribed reference value. The multiplexed signal light is controlled depending on a comparison result. Moreover, a second optical divider is provided. A part of the amplified signal light is made incident on a variable wavelength band-pass light filter which selectively passes signal light of a prescribed wavelength. The light filter is swept with a sweep signal whereby the number of channels of the signal light is detected. The foregoing reference value is set depending on the number of the channels of the signal light by a reference voltage generation circuit. The optical amplifier is controlled depending on the reference value. The foregoing variable wavelength band-pass light filter can be constituted by either an acoustooptic filter or an electric field optic filter.

7 Claims, 8 Drawing Sheets reduction of number of channels reduction of channels other than monitored channel reduction of channels including monitored channel

OPTICAL AMPLIFIER DEVICE FOR WAVELENGTH DIVISION MULTIPLEXING OPTICAL TRANSMISSION

BACKGROUND OF THE INVENTION

1. Field of the Invention

The present invention relates to an optical amplifier device for wavelength division multiplexing optical transmission, more particularly to an optical amplifier device provided with a function of controlling the output of an amplified signal light so that it becomes constant in a wavelength division multiplexing optical transmission system.

2. Description of the Related Art

FIG. 1 shows an example of a direct optical amplifier device having a first conventional constitution. In an erbium-doped optical fiber (hereinafter referred to as EDF) 61, an optical wavelength division multiplexed signal input thereto is subjected to a direct optical amplification by exciting light incident from an exciting laser diode (hereinafter referred to as LD) 69, via a wavelength division multiplexing coupler (hereinafter referred to as WDM coupler) 62. The signal light having been subjected to the direct optical amplification travels through the WDM coupler 63 and then is divided by an optical divider 63. Thereafter, part of the divided signal light is output to a photoreceptor 64 and the remainder of the signal light is output to a transmission line. The photoreceptor 64 performs an photoelectric conversion for the input signal light and outputs a current signal to a current-voltage conversion circuit 65. The current-voltage conversion circuit 65 converts the current signal supplied thereto to a voltage, and outputs it to a constant output control circuit 67. The constant output control circuit 67 compares the input voltage from the current-voltage conversion circuit 65 with a reference voltage Vref input from a reference voltage generation circuit 66, and outputs a control voltage to an exciting LD driving circuit 68 so that both of the reference voltage Vref and the input from the current-voltage conversion circuit 65 become equal. The exciting LD driving circuit 68 drives an exciting LD 69 using an LD driving current in accordance with the control voltage from the control circuit 67. With this operation, an optical power of the photo-amplifier output is kept constant.

FIG. 3 shows an example of a direct photo-amplifier device having a second conventional constitution. In an EDF 71, an optical wavelength division multiplexed signal is subjected to a direct optical amplification by an exciting light incident from an exciting LD 70 via a WDM coupler 72. The signal light having been subjected to the direct optical amplification travels through the WDM 72 and then is divided by an optical divider 73. The signal light is output to an optical transmission line and an optical wavelength narrow band-pass filter ( hereinafter referred to as an O-BPF ) 74. In the O-BPF 74, signal light of a wavelength inherent to the filter is extracted and output to a photoreceptor 75. The photoreceptor 75 performs an photoelectric conversion for the signal light input thereto and outputs it to a current-voltage conversion circuit 76. The current-voltage conversion circuit 76 converts the current signal input thereto to a voltage and then outputs the voltage to a constant output control circuit 78. The constant output control circuit 78 compares the input from the current-voltage conversion circuit 76 with a constant reference voltage Vref supplied from a reference voltage generation circuit 77, and outputs a control voltage to an exciting LD driving circuit 79 so that both of the input from the current-voltage conversion circuit 76 and the reference voltage Vref become equal. The exciting LD driving circuit 79 drives an exciting LD 70 with an LD driving current in accordance with the control voltage from the control circuit 78. With this operation, an optical power of the optical amplifier device output to the transmission line is kept constant.

In the case of the conventional constitution shown in FIG. 1, the photoreceptor 64 monitors all of the optical power in its band. For such a conventional embodiment, there has been known in general a control of an optical amplifier device as shown in FIG. 1, which is disclosed in "A low frequency response model of a constant optical output controlling EDFA", Kinoshita et al., Electronic Information Communication Society, General Meeting B-1070, 1995. In this case, when the number of channels changes from 4-channels to 2-channels as shown in FIG. 2, a power in the photoreceptor 64 appears to have been varied, that is, reduced. The constant output control circuit 67 controls the output of the photoreceptor 64 so that it is kept constant. Therefore, though an input power does not change, an optical output power in each channel becomes larger than that at the time of 4-channel inputs.

In the case of the second conventional constitution, only an optical output power of a specified channel is extracted in the O-BPF 74, and controlling for the optical output is performed. Since the optical output is monitored by the photoreceptor 75, the change of the number of the channels other than the monitored channels as shown in FIG. 4(a), does not affect the control. When the channel which is being monitored becomes unused, as shown in FIG. 4(b ), controlling becomes impossible and the optical power is excessively amplified.

SUMMARY OF THE INVENTION

To remove the disadvantages of the foregoing conventional optical amplifier device, an optical amplifier device for wavelength division multiplexing optical transmission of the present invention comprises a light input terminal for receiving multiplexed signal light obtained by performing a wavelength multiplexing for a plurality of signal light having a different wavelength to each other; an optical amplifier for optically amplifying the multiplexed light signal to output an amplified signal light; and a first optical divider for dividing a part of the amplified signal light to output first divided amplified signal light. The first divided amplified signal light is converted to an electric signal by an photoelectric converter, and the electric signal is compared with a prescribed reference value. The optical amplifier is controlled depending on the comparison result.

Here, with such constitution of the present invention, the optical amplifier device further comprises a second optical divider for dividing the amplified signal light to output a second divided amplified signal light; a variable wavelength band-pass light filter for selectively passing the signal light of a prescribed wavelength from the second divided amplified signal light depending on a sweep signal input thereto and for outputting the selected amplified signal light; a wavelength sweep circuit for sweeping the variable wavelength band-pass light filter in a band including all wavelengths of the second divided amplified signal light with a sweep signal which selectively designates signal lights of a prescribed wavelength; and a number of channels detection circuit for detecting the number of channels by detecting the number of the signal lights, which is obtained after converting the selected amplified signal light to an electric signal, and for outputting the number of channels. The reference value depending on the number of the channels is set by a reference value setting means, and the optical amplifier is controlled depending on the reference value.

Here, the optical amplifier comprises a rare earth element-doped optical fiber, an exciting light source outputting an exciting light, and a wavelength division multiplexing coupler which enters the exciting light into the rare earth element-doped optical fiber to combined it with the multiplexed signal light and for direct amplification. Moreover, the channel number detection circuit comprises a photoreceptor for converting the selected amplified signal light to an electric signal and a counter circuit for counting the number of pulses in a pulse series of the electric signal. The control circuit includes an exciting light output control circuit for controlling the intensity of the exciting light.

Furthermore, the variable wavelength band passing light filter is formed of either an acoustooptical fiber or an electrooptical fiber. Moreover, the wavelength sweep circuit periodically sweeps in a predetermined band at a predetermined cycle.

In an optical wavelength division multiplexing transmission, the variable wavelength band-pass light filter is swept in a prescribed band, which extracts the wavelength component selected in response to a sweep signal and passes it therethrough. An output from the filter is subjected to a photoelectric conversion and the number of channels is counted by the pulse counter. A reference voltage is converted depending on the number of the channels. The reference voltage is compared with a total electric power detected by the photoreceptor to control the output so that it is kept constant, whereby an optical output level can be controlled to be constant regardless of the number of the channels which are multiplexed.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

An optical amplifier device for wavelength division multiplexing optical transmission of the present invention will be described in detail with reference to the accompanying drawings.

Figure 1:
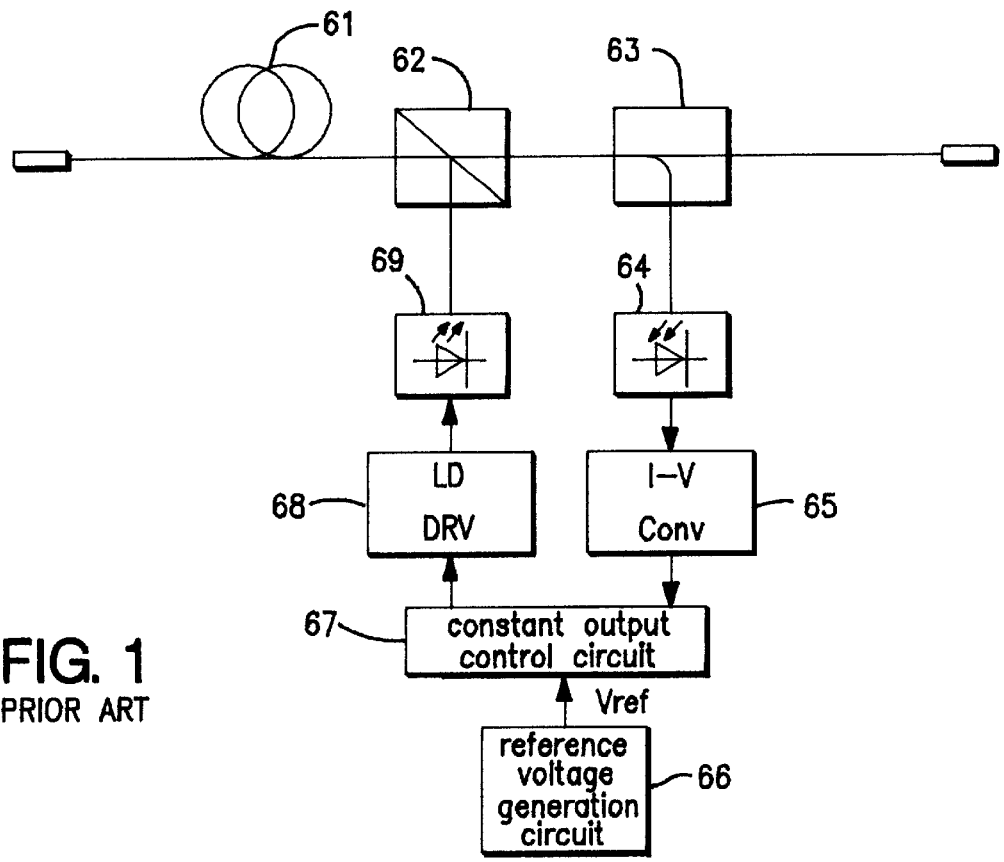
FIG. 1 is a block diagram showing an example of a conventional optical amplifier device.
Figure 2:
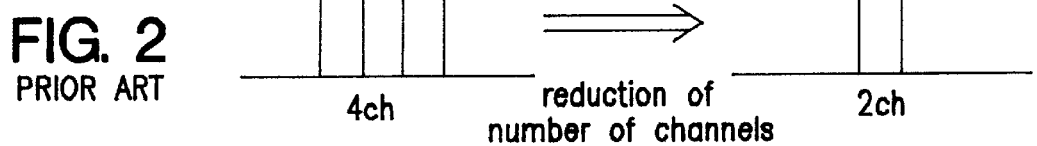
FIG. 2 is a view showing an output spectrum at the time when the number of channels of the optical amplifier device shown in FIG. 1 is reduced.
Figure 4A:
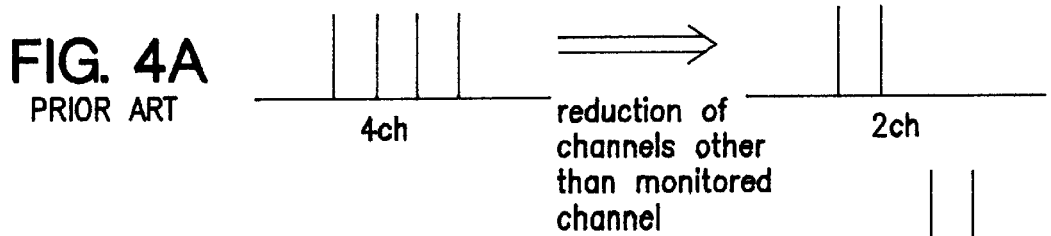
FIG. 4a is a view showing an output spectrum of the optical amplifier device shown in FIG. 3, at the time when the number of channels other than monitored channels is reduced.
Figure 4B:
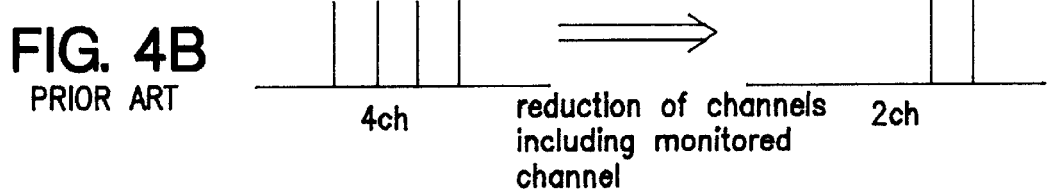
FIG. 4b is a view showing an output spectrum of the optical amplifier device shown in FIG. 3, at the time when the number of channels including the monitored channels is reduced.
Figure 3:
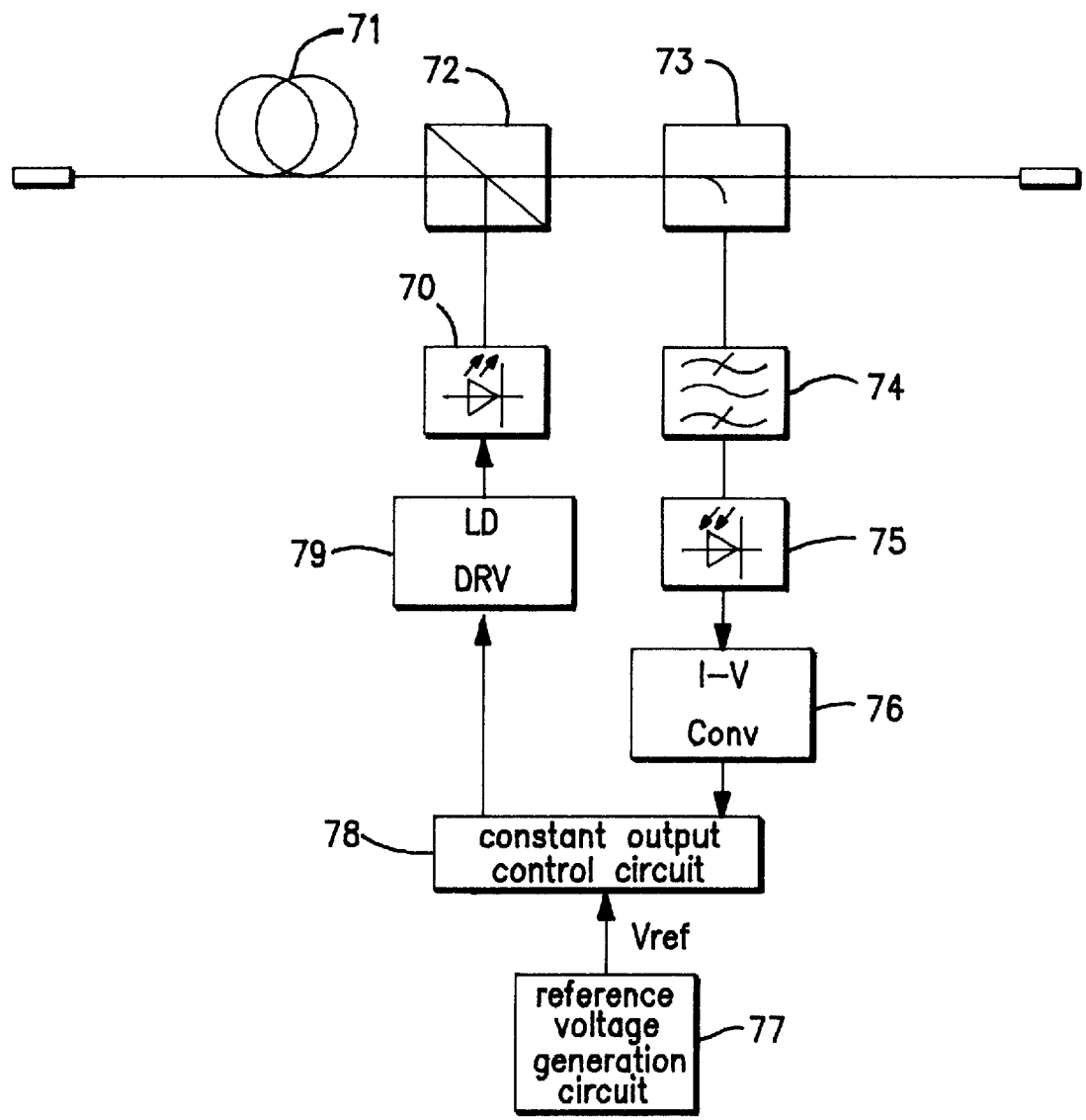
FIG. 3 is a block diagram showing another example of a conventional optical amplifier device.
Figure 5:
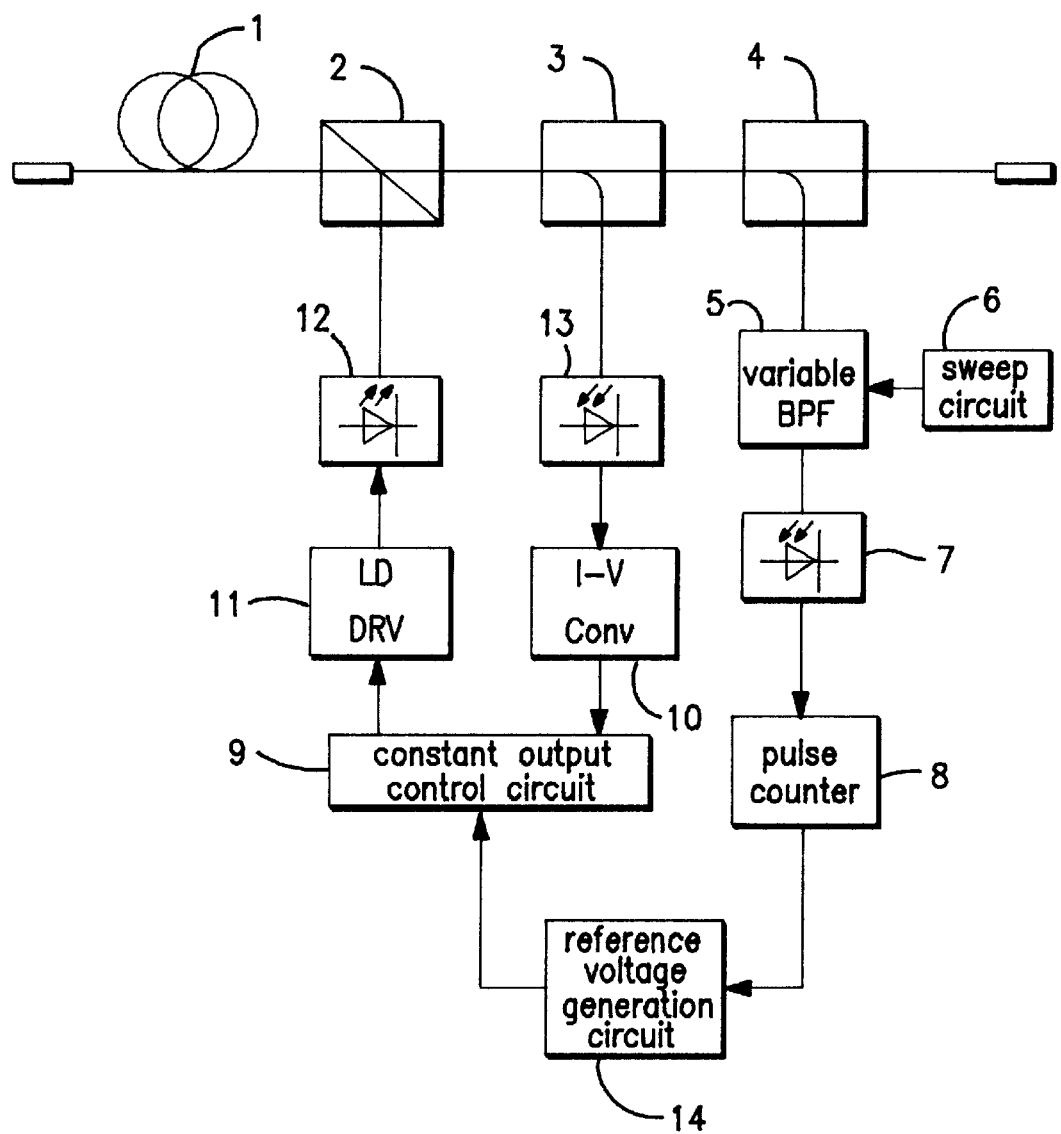
FIG. 5 is a block diagram showing the constitution of a first embodiment of the optical amplifier device for wavelength division multiplexing optical transmission of the present invention.

FIG. 5 is a block diagram showing a first embodiment of the optical amplifier device of the present invention.

The optical amplifier comprises, as the basic composing elements to amplify an input signal light, an erbium-doped optical fiber 1, an exciting LD 12 for outputting exciting light and a WDM coupler 2 for combining the exciting light incident on the erbium-doped optical fiber 1 with the signal light. It should be noted that, in this embodiment, the optical-amplifier is of a rear-exciting type which makes the exciting light incident from the rear end of the erbium-doped optical fiber 1.

A multiplexed signal light obtained by performing a wavelength division multiplexing for a plurality of signal lights having respective different wavelengths is made incident into the erbium-doped optical fiber 1 from the left side in FIG. 5, and, as described above, the multiplexed signal light is optically amplified by the exciting light incident from the rear end of the optical fiber 1 and output in the right direction.

Here the light having a plurality of wavelengths of 1.55 $\mu$m band is used for the signal light, and the wavelength of the exciting light is 1.48 $\mu$m.

The amplified signal light passes through the WDM coupler 2 and is partially divided by an optical divider 3. The divided signal light is converted to a current signal. The current signal is further converted to a voltage signal by a current-voltage converter 10. On the other hand, the remaining part of the amplified signal light is further divided by an optical divider 4 which is arranged behind the optical divider 3. The divided part of the signal light is input to a variable wavelength band-pass light filter (hereinafter referred to as variable BPF) 5, and the remaining part of the signal light is output to a transmission line. The variable BPF 5 is able to shift the central wavelength of the band of the signal light passing therethrough by a signal received from a sweep circuit 6. The sweep circuit 6 performs a sweep operation so that the variable BPF 5 shifts the central wavelength of the band between the shortest wavelength and the longest wavelength of the multiplexed signal light.

During sweeping, the signal light that has passed through the variable BPF 5 is received by a photoreceptor 7, and the signal light is converted to a current signal. The current signal is input to a pulse counter 8, whereby the number of pulses is detected for one cycle of sweeping by the sweep circuit 6. By detecting the number of the pulses, the number of channels of the signal light which has been subjected to the wavelength division multiplexing can be known, and then a reference voltage is set by a reference voltage generation circuit 14 depending on the number of the channels. In this embodiment, the reference voltage per one channel is previously set, whereby the reference voltage is discretely set depending on the number of the channels detected.

A constant output control circuit 9 controls the output of the optical amplifier depending on the reference voltage set such that the value of the voltage signal supplied from the current-voltage conversion circuit 10 becomes constant. In this embodiment, a driving current supplied to the exciting LD 12 is controlled by an LD driving circuit 11, whereby the exciting light output is controlled.

As described above, in the present invention, the amplified signal light is partially divided by the first optical divider 3 on the output side of the optical amplifier and the divided signal light is compared with the reference value and controlled. On the other hand, the amplified signal light is further partially divided by the second optical divider 4 and then the number of the channels is detected and the foregoing reference value is set depending on the number of the channels. Therefore, when the comparison is performed, it is possible to control amplification depending on the number of the channels, whereby an automatic optical amplifying can be suitably controlled in spite of variations in the number of the channels.

Here, sweeping for the signal light among the foregoing operations of the optical amplifier device of the present invention will be described with reference to FIG. 6, in more detail.

Figure 6:
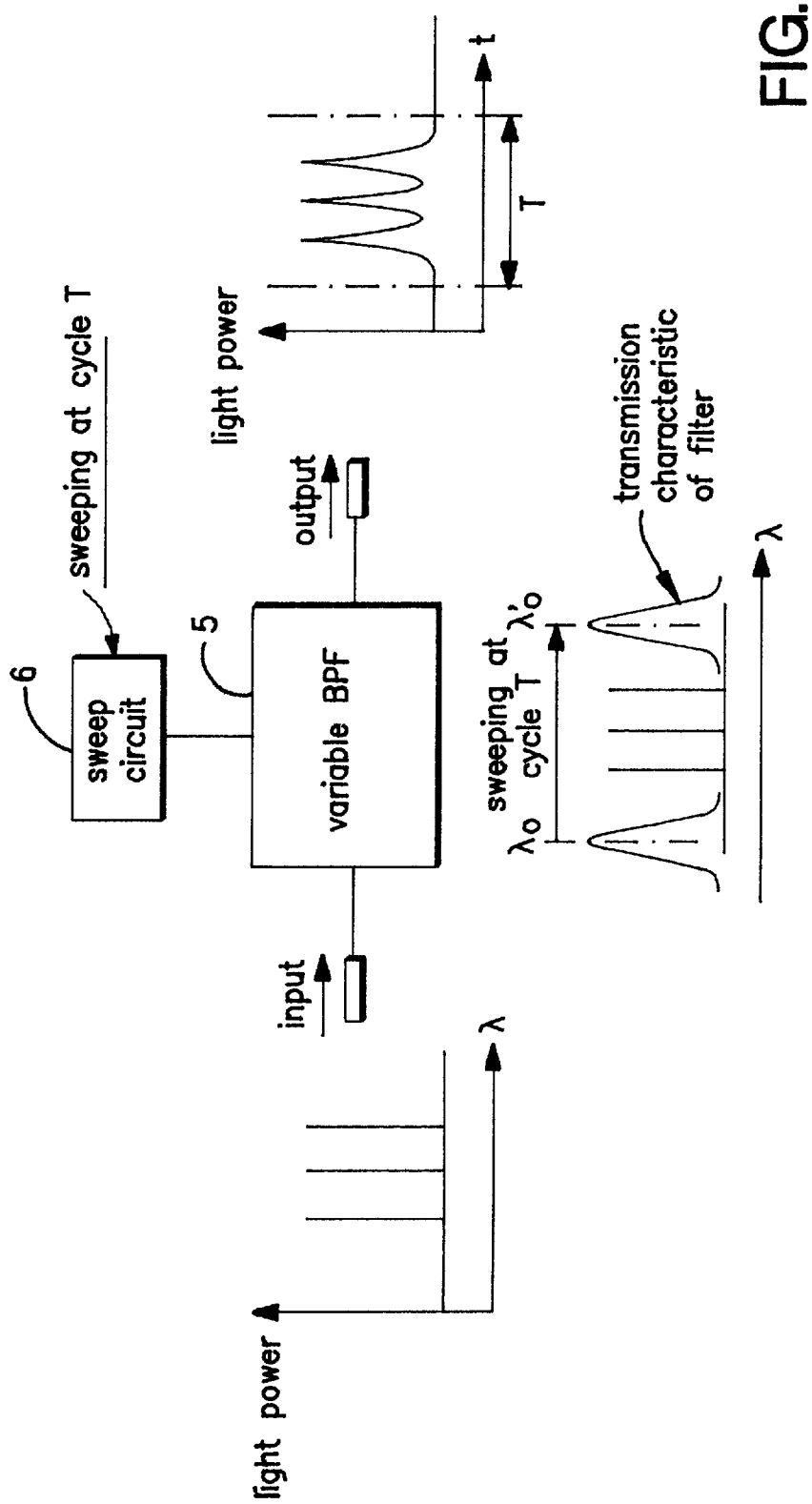
FIG. 6 is a view showing an operation of a variable wavelength band-pass optical filter used in the optical amplifier device of the present invention.

The BPF 5 possesses a characteristic as is shown in the lower portion of FIG. 6. Specifically, the variable BPF 5 possesses a function to selectively pass the light having a wavelength within the prescribed band width. Here, since the object is the detection of the number of the channels, the foregoing band width is set to be narrower than the band width between two adjacent wavelengths of the signal light among these of the multiplexed signal light. Moreover, the variable BPF 5 possesses another function to successively shift the central wavelength of the foregoing band width from the shortest wavelength $\lambda 0$ to the longest wavelength $\lambda 0'$ the multiplexed signal light, by receiving the signal from the sweep circuit 6.

Now, when the signal light having been subjected to the wavelength division multiplexing is input to the variable BPF 5 to be swept as is shown in the left portion of FIG. 5, peaks of light power are detected with the passage of time, as is shown in the right portion of FIG. 5. By detecting the number of the peaks by the pulse counter 8, the number of the channels of the signal light which has been subjected to the wavelength division multiplexing can be detected.

Next, a second embodiment of the present invention will be described.

Figure 7:
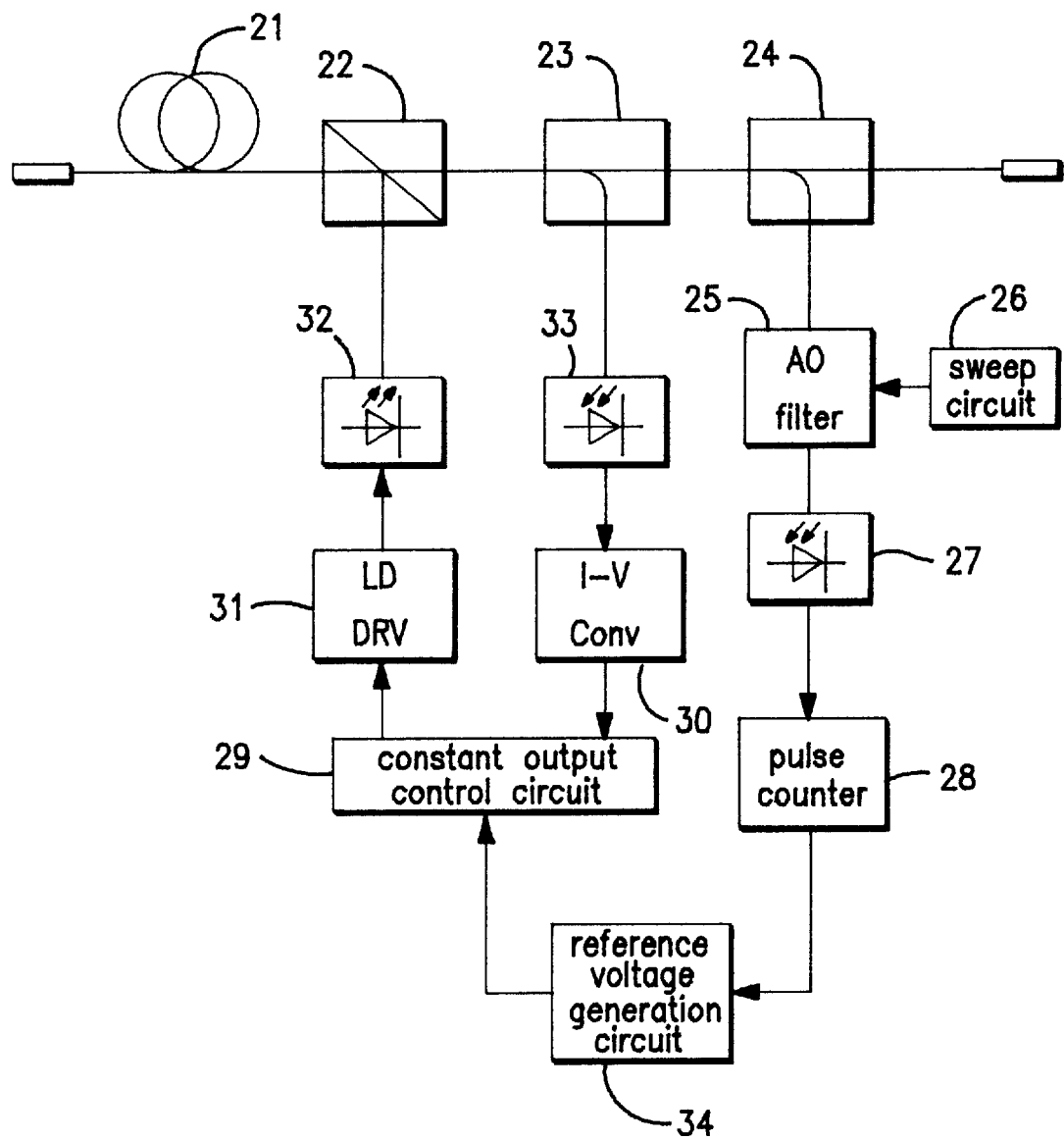
FIG. 7 is a block diagram showing a constitution of a second embodiment of the optical amplifier device of the present invention.
Figure 8:
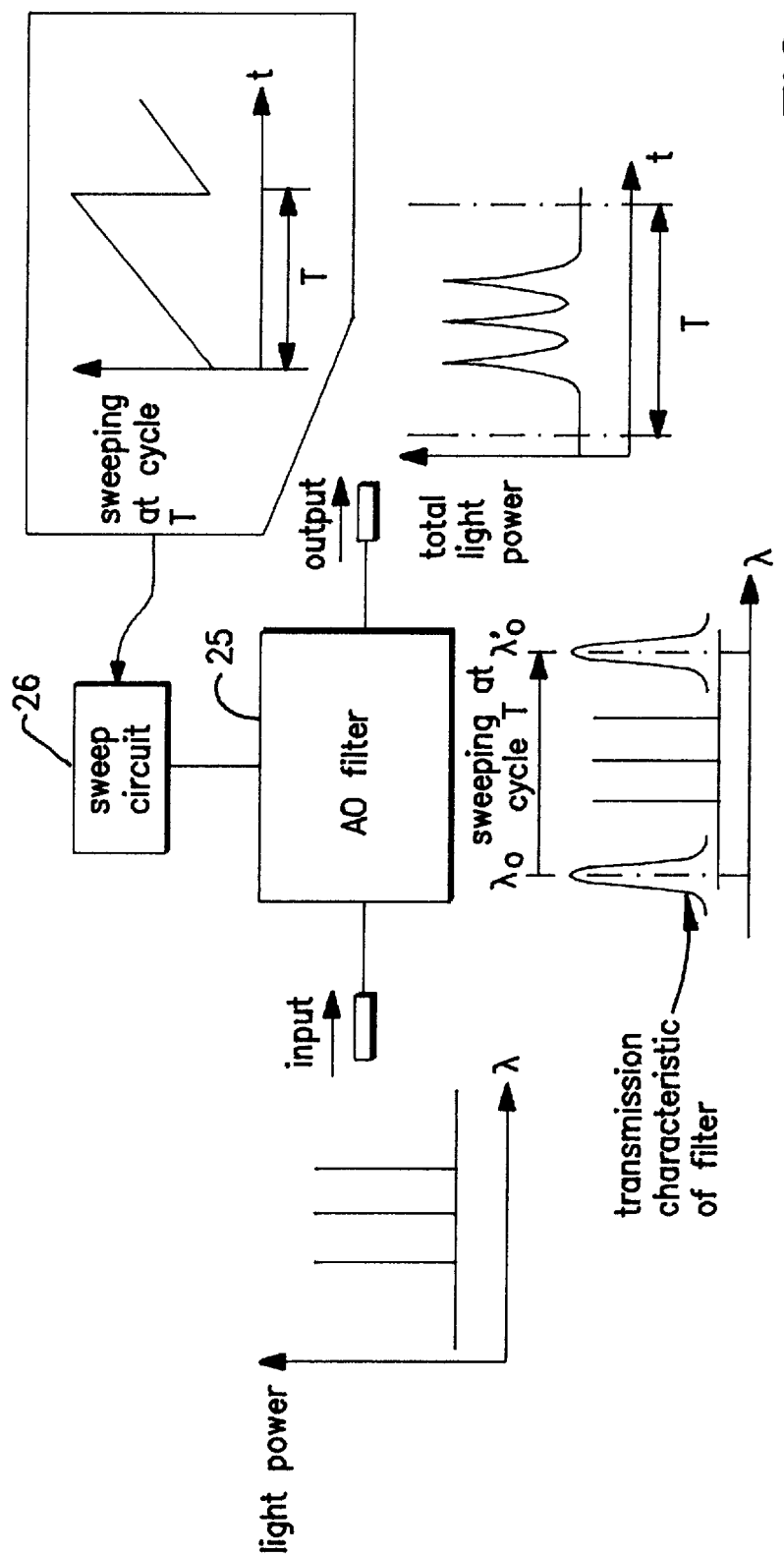
FIG. 8 is a view showing an operation of an acoustooptic filter used in the optical amplifier device of the present invention.

FIG. 7 shows a constitution of the second embodiment. The constitution of the second embodiment is essentially the same as that shown in FIG. 5. An acoustooptic filter (AO filter) 25 is used as an example of the variable BPF. The acoustooptic filter 25 receives a signal from a sweep circuit 26 and a transmission wavelength is swept in a prescribed cycle of time T. Since a transmission wavelength characteristic of the acoustooptic filter 25 changes linearly for the frequency of a vibration supplied to the AO element, a transmission band can be shifted by applying the vibration which changes its frequency every cycle T as is shown in the right portion of FIG. 8.

Furthermore, a third embodiment of the present invention will be described.

Figure 9:
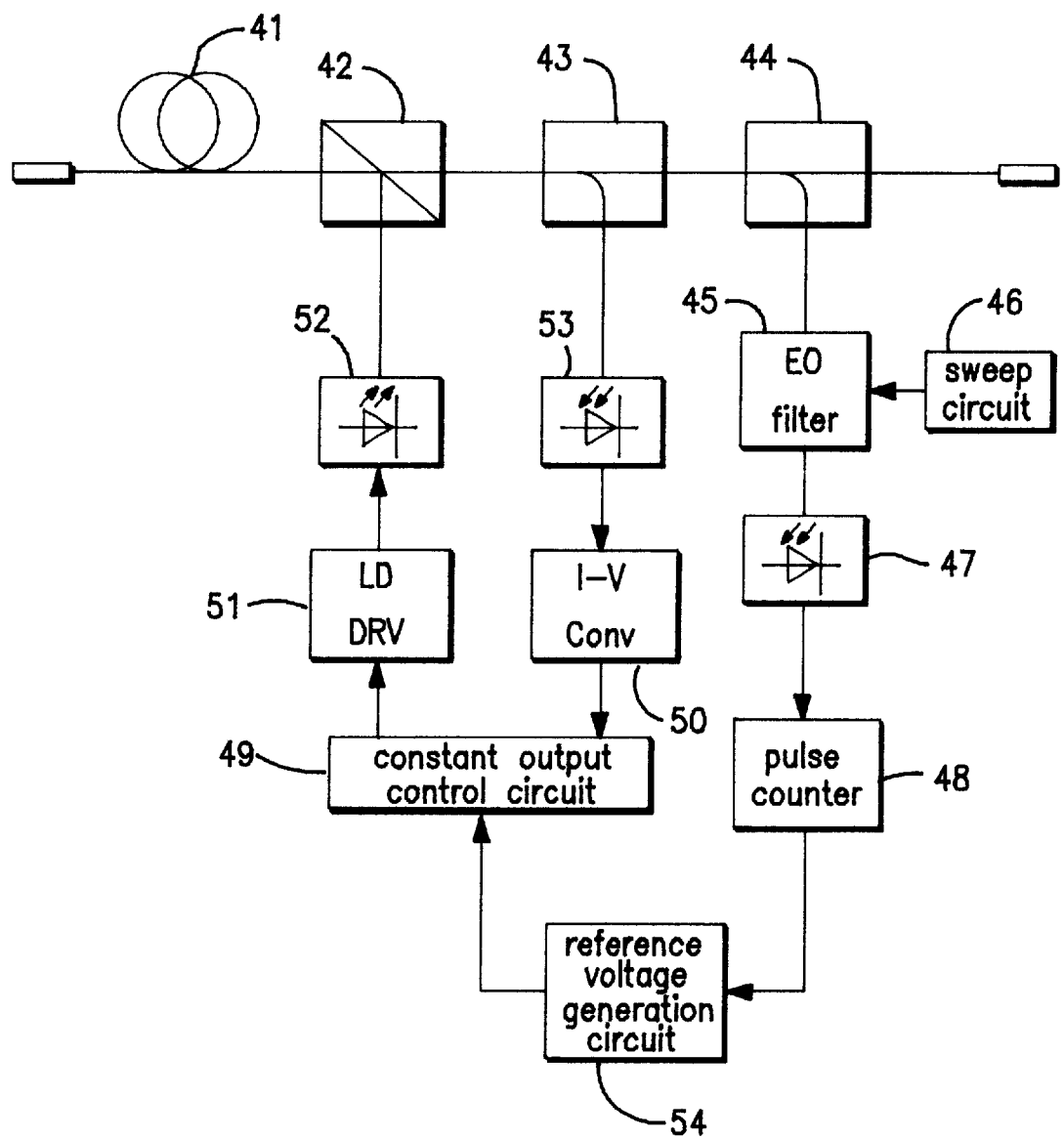
FIG. 9 is a block diagram showing a constitution of a third embodiment of the optical amplifier device of the present invention.
Figure 10:
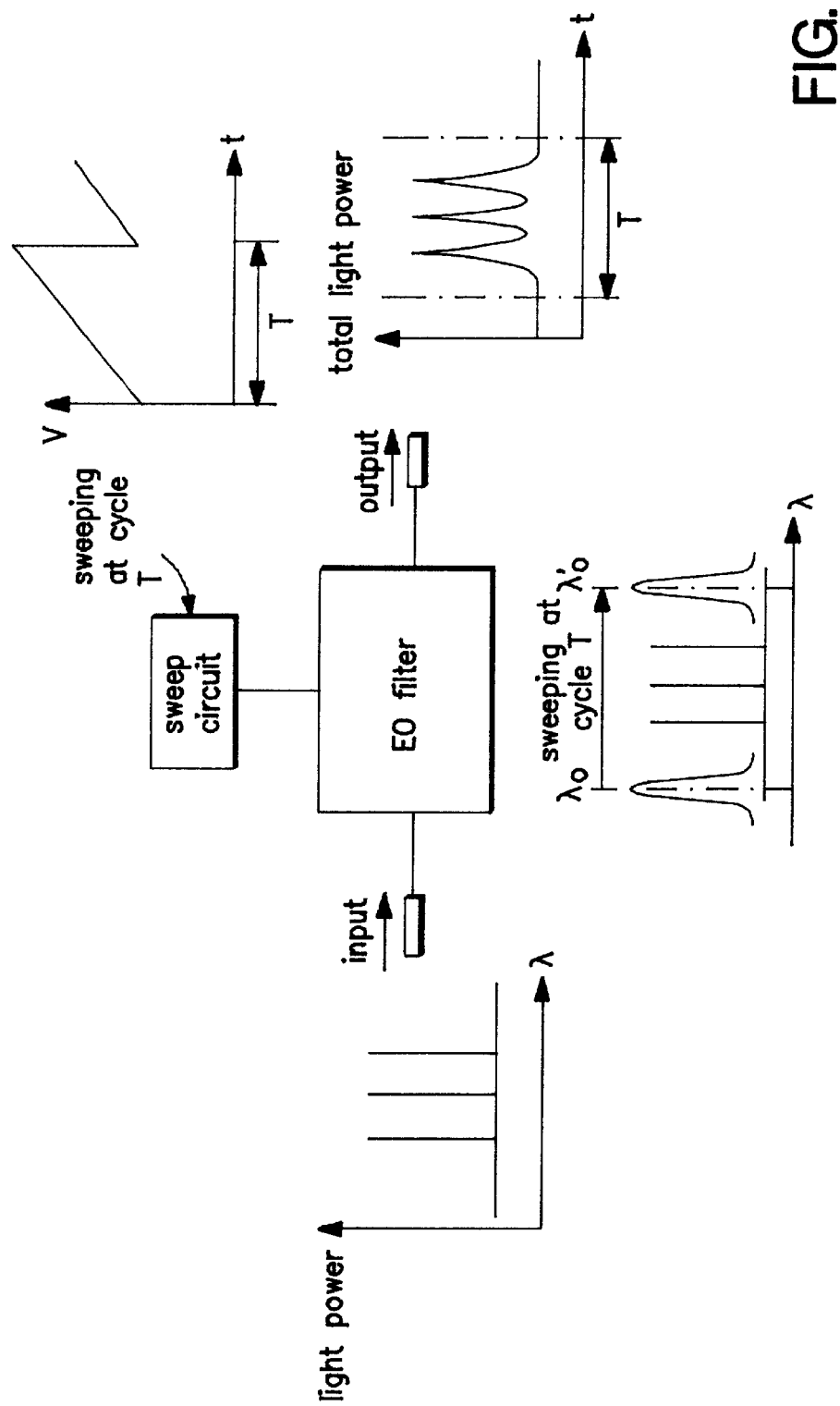
FIG. 10 is a view showing an operation of an electrooptic filter used in the optical amplifier device of the present invention.

FIG. 9 shows a constitution of the third embodiment of the present invention. The essential constitution of the third embodiment is also the same as those of the first and second embodiments. In the third embodiment, an electric field optic filter (an EO filter) 45 is used as the variable BPF. Since a transmission wavelength characteristic of the electric field filter 45 also changes linearly for a frequency of an electric field applied to an EO element, a transmission band can be shifted by applying an electric field to the EO element, which changes its frequency in a cycle T as is shown in the right portion of FIG. 8.

As described above, in the present invention, the first optical divider is arranged on the output side of the optical amplifier which optically amplifies the signal light which has been subjected to the wavelength division multiplexing and outputs the amplified signal light. Here, the amplified signal light is partially divided and the divided signal light is converted to the electrical signal by the photoelectric converter. The electric signal is compared with the prescribed reference value. The optical amplifier is controlled depending on the comparison result. Moreover, the second optical divider is provided. Part of the divided amplified signal light divided by the second optical divider is swept by the variable BPF which selectively passes the signal light having a specified wavelength, whereby the number of the channels is detected. The foregoing reference value is set by the reference voltage generation circuit depending on the number of the channels. The optical amplifier is controlled based on the reference value. The foregoing variable BPF can be constituted by either the acousto optic filter or the electrical field optic filter. By adopting the foregoing constitution of the optical amplifier device in the wavelength division multiplexing optical transmission system, the optical output of each channel can be kept constant in spite of variations in the number of the channels of the signal light.

Although the preferred embodiment of the present invention has been described in detail, it should be understood that various changes, substitutions and alternations can be made therein without departing from spirit and scope of the inventions as defined by the appended claims.

What is claimed is:

1. An optical amplifier device for wavelength division multiplexing optical transmission comprising:

light input means for receiving multiplexed signal light obtained by performing a wavelength division multiplexing for a plurality of signal light having respective different wavelengths;

optical amplifier means for receiving said multiplexed signal light to optically amplify said multiplexed signal light, and for outputting the amplified signal light;

first optical division means for partially dividing said amplified signal light to output first divided amplified signal light;

photoelectric converting means for converting said first divided amplified signal light to an electric signal;

control means for comparing said electric signal with a prescribed reference value and for controlling said optical amplifier means so that both of said electric signal and said reference value become equal to each other;

second optical division means for partially dividing said amplified signal light to output second divided amplified signal light;

a variable wavelength band-pass light filter for passing signal light of a prescribed wavelength selectively from said second divided amplified signal light in response to a sweep signal supplied thereto and for outputting a selected amplified signal light;

wavelength sweep means for sweeping said variable wavelength band-pass light filter at a band including all wavelengths of said second divided amplified signal light and for outputting said sweep signal to selectively designate said signal light of the prescribed wavelength;

photoelectric converting means for converting said selected amplified signal light to an electric signal;

channel number detection means for detecting the number of channels of said multiplexed signal light and for outputting the number of the channels; and reference value setting means for setting said reference value depending on said number of the channels.

2. The optical amplifier device according to claim 1, wherein said optical amplifier means comprises a rare earth element doped optical fiber; an exciting light source outputting exciting light; and a wavelength division multiplexing coupler which makes said exciting light incident into said rare earth element doped optical fiber, to combine said exciting light with said multiplexed signal light and to perform a direct optical amplification for said multiplexed signal light in said optical fiber.

3. The optical amplifier device according to claim 1, wherein said channel number detection means comprises a counter circuit which counts the number of pulses of said electric signal.

4. The optical amplifier device according to claim 1, wherein said control means includes an exciting light output control circuit which controls an output intensity of said exciting light.

5. The optical amplifier device according to claim 1, wherein said variable wavelength band pass light filter is an acoustooptic filter.

6. The optical amplifier device according to claim 1, wherein said variable wavelength band-pass light filter is an electric field optic filter.

7. The optical amplifier device according to claim 1, wherein said wavelength sweep means performs sweeping periodically in said band at a prescribed cycle.

* * * * *